UNITED STATES PATENT OFFICE.

JOKICHI TAKAMINE, OF NEW YORK, N. Y., ASSIGNOR TO PARKE, DAVIS & COMPANY, OF DETROIT, MICHIGAN, A CORPORATION OF MICHIGAN.

GLANDULAR COMPOUND AND PROCESS OF PRODUCING SAME.

945,638.  Specification of Letters Patent.  Patented Jan. 4, 1910.

No Drawing.  Application filed February 4, 1904.  Serial No. 192,087.  (Specimens.)

*To all whom it may concern:*

Be it known that I, JOKICHI TAKAMINE, a subject of the Emperor of Japan, residing in New York, in the county and State of New York, have invented a new and useful Glandular Compound and Process of Producing the Same, of which the following is a specification.

In United States Patent No. 730,176, issued to me June 2nd, 1903, I have described a new product having the blood-pressure-raising, astringent and hemostatic properties and re-actions of the suprarenal capsules or glands, in a pure, concentrated and stable form, and in other United States patents, viz., Nos. 731,175, 730,196 and 730,199 issued to me I have described processes for preparing said product.

In order to facilitate the description of the present invention, and for the sake of convenience, the terms "principle" or "said principle" are employed in the specification to designate the blood-pressure-raising hemostatic and astringent principle of the suprarenal glands, set forth and described in U. S. Patent No. 730,176.

The object of the present invention is the production of new compounds of said principle.

The exact structural composition or constitution of said principle has not, as far as is at present known, been definitely ascertained but it has been ascertained that its formula probably is $C_{10}H_{15}NO_3$ and that it probably contains at least two hydroxyl groups and one amid group. It has been ascertained that probably both the hydroxyl group and amid group form the basis for producing various compounds of said principle.

The said principle enters into reaction with metals and forms compounds thereof. A compound of the principle with iron, for instance, may be prepared in the following manner: 2 parts of the principle are added to a concentrated aqueous solution of ferrous sulfate containing 3 parts of the crystallized sulfate. Lead or barium hydroxid is then added to neutralize or counteract the sulfuric acid present in the sulfate. The reaction is probably illustrated by the following equation:

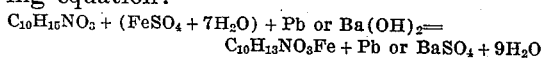

On the addition of the lead or barium hydroxid the sulfate of either base is precipitated and the super-natant liquid assumes a purple red color. In order to hasten the precipitation of the lead or barium sulfate a small quantity of alcohol is added if required, and the solution filtered. The filtrate is now evaporated in vacuum to a syrupy consistency and alcohol is added which precipitates the ferrous compound. This compound is collected on a suction or exhaust filter and thoroughly washed with strong alcohol, and then dried in an appropriate apparatus at the room temperature (of about 20 to 23° C.) *in vacuo* over sulfuric acid. After drying it is non-hygroscopic. Instead of using ferrous sulfate and barium or lead oxid or hydroxid, any kind of ferrous salt and any metal or alkali hydroxid may be substituted. But the substances previously mentioned are preferred for the reason that the barium and lead sulfates are insoluble in water, thus permitting an easy separation of the resulting ferrous compound of the principle. This ferrous compound is a powder having a dark purplish color and dissolves readily in water and in dilute alcohol. This purplish color of the aqueous solution is discharged by the addition of mineral acid; and if the solution be dilute it becomes decolorized. The color is restored however by neutralization of the acid. Ammonia and the fixed alkalies do not precipitate the iron present therein. The compound has a peculiar astringent and bitter taste. In re-action with ferric chlorid the purplish red color changes to a fresh green, this green color being a characteristic reaction of the principle.

It will be understood that the invention is not restricted to the exact proportions and amounts specified nor to the exact substances stated, since these have been specified merely as illustrative examples and to afford a guide to the production of the compounds described by those skilled in the art. Other metals than iron may be employed to produce the metal compound of the principle; for instance nickel, lead and other metallic compounds may also be produced, in a similar manner.

Having thus described my invention, the following is what I claim as new therein and desire to secure by Letters Patent:—

1. The herein described iron compound of the blood-pressure-raising principle of the suprarenal glands, said compound reacting with ferric chlorid to produce a fresh green color and the iron constituent of said compound being unprecipitated by alkali precipitants.

2. The herein described ferrous compound of the blood-pressure-raising principle of the suprarenal glands, being in dry form a purplish non-hygroscopic powder, soluble in water and in dilute alcohol, reacting with ferric chlorid to produce a fresh green color, the iron of said compound being unprecipitated by alkali precipitants.

3. In a process of producing an iron compound of the blood-pressure-raising, hemostatic and astringent principle of the suprarenal glands the steps which consist in reacting upon said principle with a protosalt of iron, then adding to the reaction mixture a reagent to neutralize the acid of the salt employed and then removing the precipitate formed by the action of said reagent.

4. The herein described process for producing an iron compound of the blood-pressure-raising hemostatic and astringent principle of the suprarenal glands which consists in adding to said principle a solution of ferrous sulfate, precipitating and neutralizing the acid constituent of said sulfate by adding a basic oxygen compound of an alkaline earth and separating or removing the precipitate formed, evaporating the filtrate to a syrupy consistency and adding a precipitant for the iron compound.

JOKICHI TAKAMINE.

Witnesses:
P. FRANK SMITH,
HARRY A. KNIGHT.